T. F. Mayhew.
Oyster Dredge.
Nº 89,323.                           Patented Apr. 27, 1869.
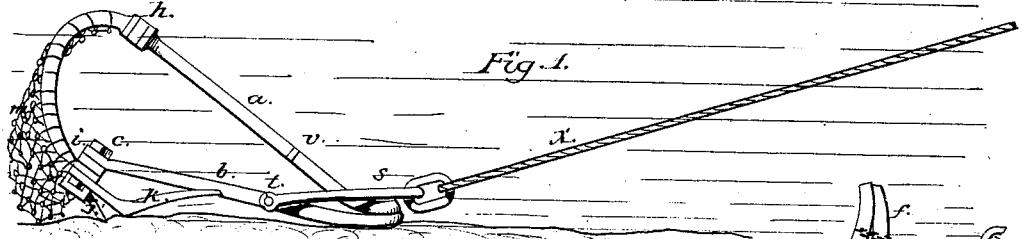
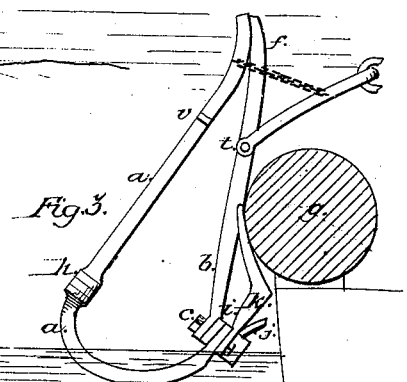
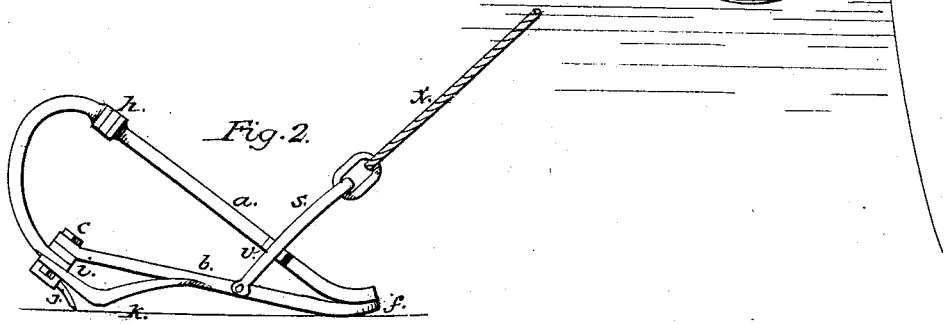
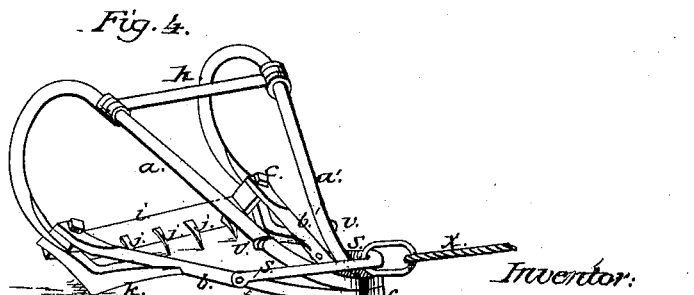
Witnesses:
Wm A. Steel
John Parker
Inventor:
T. F. Mayhew

THOMAS F. MAYHEW, OF PORT NORRIS, NEW JERSEY.

Letters Patent No. 89,323, dated April 27, 1869.

IMPROVEMENT IN OYSTER-DREDGES.

The Schedule referred to in these Letters Patent and making part of the same.

*To all whom it may concern:*

Be it known that I, THOMAS F. MAYHEW, of Port Norris, Cumberland county, New Jersey, have invented an Improvement in Oyster-Dredges; and I do hereby declare the following to be a full, clear, and exact description of the same.

My invention consists of a bent bar, pivoted to the frame of an oyster-dredge, and to which the operating rope is attached, as hereafter explained, in order to prevent the said dredge from being elevated at its front end when dragged forward, an objection common to ordinary apparatus of this class.

In order to enable others skilled in the art to make and use my invention, I will now proceed to describe the mode of constructing and using the same, reference being had to the accompanying drawing, which forms a part of this specification, and in which—

Figures 1 and 2 are side views of my improved oyster-dredge;

Figure 3 the same as it appears when being drawn up the side of a vessel; and

Figure 4, a perspective view.

The improved dredge does not differ in form from those in common use, its frame consisting of four rods $a$ and $a'$, and $b$ and $b'$, the two former of which are curved at the rear, and connected to the lower rods $b$ and $b'$ by suitable bolts $c$, and all of the rods meeting in a single point at the front of the dredge, where they are welded or otherwise secured together, so as to form a nose, $f$.

The upper rods $a$ and $a'$ are connected together by a brace, $h$, and the tooth bar $i$ provided with the usual teeth $j$, is secured in its proper position by the same bolts, $c$, which connect the rods forming the frame of the dredge. (See fig. 4.)

The fenders $k$ $k$, which are arranged beneath the rods $b$ and $b'$ in advance of the teeth of the dredge, are also secured at their rear ends by means of the bolts $c$ $c$.

The usual bag or netting $m$, consisting of metal rings linked together, and attached to the rear of the dredge, is represented in fig. 1.

In ordinary dredges, the front end $f$ is formed into an eye, to which the operating rope $x$ is attached. This plan answers well so long as the apparatus is used in shallow water, or at a distance from the vessel, but is objectionable when the rope $x$ has to be worked at an angle much greater than that illustrated in fig. 1, there being then a constant tendency, as the angle is increased in approaching the vessel, to elevate the front end of the dredge sufficiently to raise its teeth $j$ from the bottom, and thus interfere with their proper duty of raking the oysters into the bag $m$.

This objection I have entirely overcome by connecting the operating rope to a bar, $s$, which is so bent as to pass over the rods $a$ and $a'$ of the dredge, and is pivoted at its opposite ends to the rods $b$ and $b'$, at points $t$ $t$, nearly midway between the nose $f$ and tooth bar $j$.

The bar $s$ is arranged to turn freely upon the pivots $t$, and stops $v$ $v$ may be arranged upon the rods $a$ and $a'$, to prevent the said bar from being turned backwards to a greater extent than is illustrated in fig. 2, while to prevent it being moved beyond the proper point in a contrary direction, the chain $y$, fig. 3, may, if desired, be employed.

When the apparatus is dragged toward the vessel, into which it is to be raised, the bar $s$ will adapt itself to the gradual change of angle of the operating rope, and will, as its pivots are in effect, the points of attachment of the operating rope, so reduce the tendency of the dredge to become elevated at the front end, as to enable it to be maintained in the horizontal or nearly horizontal position required.

In lifting the dredge over the side of the vessel, the fenders $k$ $k$ will perform their usual duty of warding off the points of the teeth $j$, and of facilitating the passage of the dredge over the roller $y$, fig. 3.

The bar $s$ will also much facilitate this operation, by turning outward from the rods $b$ and $b'$, and thus preventing the tilting of the dredge until it has been sufficiently elevated.

I claim as my invention, and desire to secure by Letters Patent—

The bent bar $s$, pivoted to the rods $b$ and $b'$ of an oyster-dredge, and arranged for attachment to the operating rope $x$ of the same, substantially as and for the purpose herein described.

In testimony whereof, I have signed my name to this specification, in the presence of two subscribing witnesses.

THOMAS F. MAYHEW.

Witnesses:
ANDREW I. HUGG,
DANIEL B. FERGUSON.